US006282768B1

(12) United States Patent
Rapp

(10) Patent No.: US 6,282,768 B1
(45) Date of Patent: Sep. 4, 2001

(54) TOOL AND SEAL COVER FOR SHAFT ASSEMBLY

(75) Inventor: Robert J. Rapp, Simpsonville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/377,260

(22) Filed: Aug. 19, 1999

(51) Int. Cl.[7] ........................................ B23P 19/02

(52) U.S. Cl. ........................................ 29/235; 29/275

(58) Field of Search ........................ 29/235, 254, 255, 29/275, 278; 211/605; 206/372, 375, 378, 230, 231

(56) References Cited

U.S. PATENT DOCUMENTS 3,896,654 * 7/1975 Mancini ........................ 29/275
3,942,234 * 3/1976 Kepler ........................ 29/275
4,586,228 * 5/1986 Rodolf ........................ 29/275

* cited by examiner

*Primary Examiner*—Robert C. Watson
(74) *Attorney, Agent, or Firm*—Lloyd G. Farr; Alexander M. Gerasimow; William R. Walbrun

(57) ABSTRACT

A tool for driving an annular seal into a cavity defined by a shaft assembly housing that surrounds a rotatable shaft includes an elongated body having an interior cavity that opens at a first end of the body for receiving the shaft. The body defines an annular surface at the first end. The annular surface has an inner diameter greater than the outer diameter of the rotatable shaft and forming a removable frictional seal with the inner diameter of the cavity.

4 Claims, 8 Drawing Sheets

TOOL AND SEAL COVER FOR SHAFT ASSEMBLY

BACKGROUND OF THE INVENTION

Shaft assemblies such as motors and speed reducers generally include a housing in which a shaft is rotatably disposed. Motors generally include means for rotationally driving the shaft, which extends out of the housing through a bore. Speed reducers generally include a driven input shaft that rotationally drives one or more output shafts through gearing that controls the rotational speed of the output shaft(s). The input and output shafts extend into and out of the housing through respective bores. Shaft assemblies such as motors and speed reducers sometimes have a double output shaft.

Such assemblies often include a lip seal at the housing bore that extends between the housing and the shaft. The lip seal typically includes a rigid outer portion secured within the bore by an interference fit between the seal's outer circumferential surface and the bore's inner circumference. An elastomeric portion extends inward from the rigid outer portion to engage the shaft. This elastomeric lip bends axially inward toward the shaft assembly's interior, thus preventing the escape of lubricant from the interior area while providing an effective seal that prevents entrance of exterior contaminants into the interior area.

SUMMARY OF THE INVENTION

The present invention recognizes and addresses disadvantages of prior art construction and methods.

Accordingly, it is an object of the present invention to provide a tool for driving an annular seal into a cavity defined by a shaft assembly housing that surrounds a rotatable shaft.

It is a further object of the present invention to provide a seal cover for a shaft rotatably disposed in a cavity defined by a housing surrounding the shaft.

One or more of these objects are achieved by a tool for driving an annular seal into a cavity defined by a shaft assembly housing that surrounds a rotatable shaft. The tool includes an elongated body having an interior cavity that opens at a first end of the body for receiving the shaft. The body defines an annular surface at the first end to abut the seal. The annular surface has an inner diameter greater than an outer diameter of the shaft and an outer diameter forming a removable frictional seal with an inner diameter of the interior cavity.

In another embodiment, a seal cover for a shaft that is rotatably disposed in a cavity defined by a housing surrounding the shaft includes an elongated body having an enclosed, generally cup-shaped, interior cavity that opens at an end of the body for receiving the shaft. The body defines an annular outer surface at the end to abut the housing.

The accompanying drawings, which are incorporated in and constitute a part of the specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
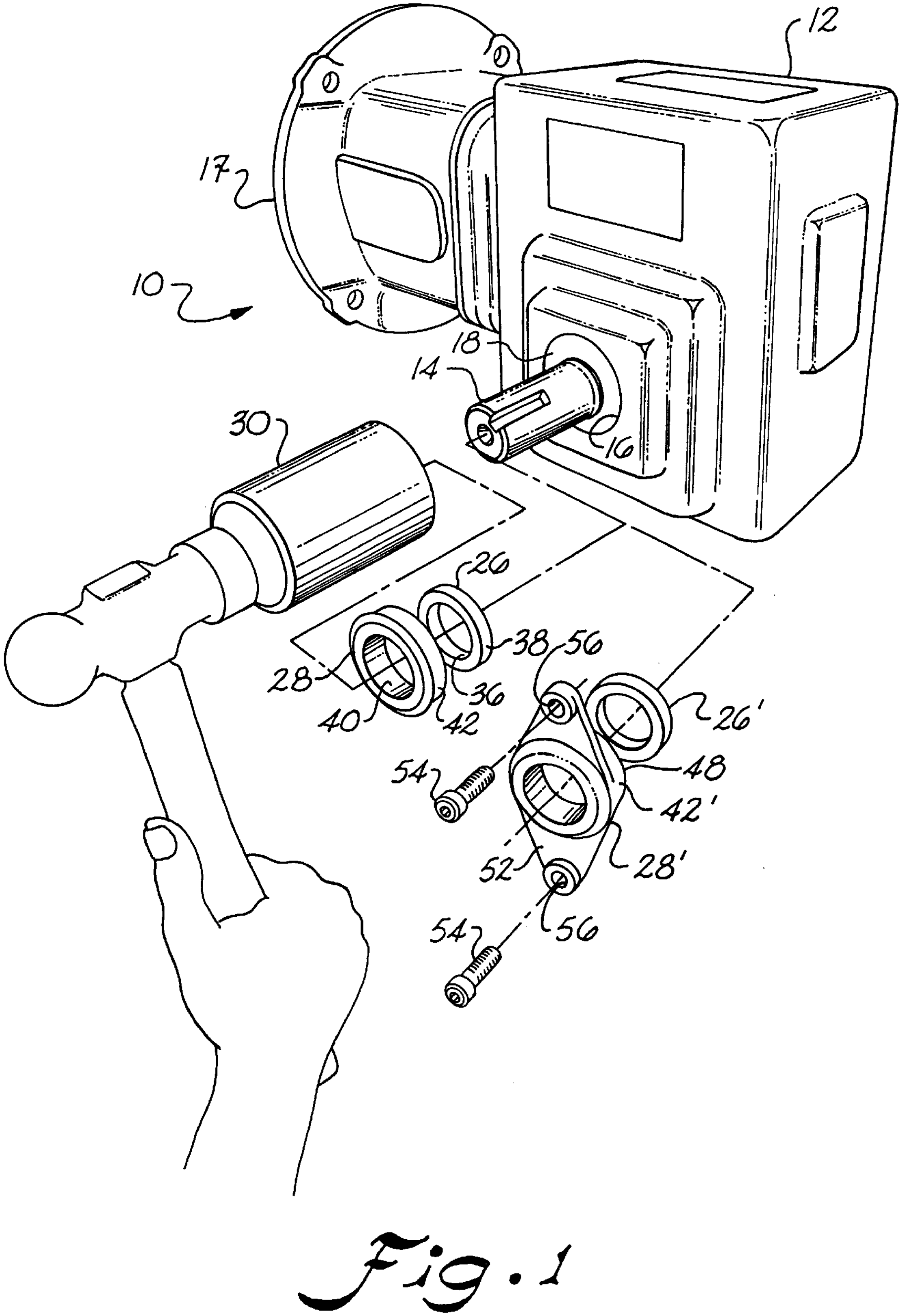
FIG. 1 is an exploded perspective view of preferred embodiments of a shaft assembly for use with a tool or cover according to the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIG. 1, a speed reducer 10 includes a housing 12 and an output shaft 14 extending through a bore 16 in the housing. The output shaft is driven by an input shaft surrounded by a bell portion 17 of housing 12. Although speed reducers are shown in the illustrated embodiments herein, it should be understood that this is for exemplary purposes only and that any suitable shaft assembly may be employed within the present invention.

Figure 2:
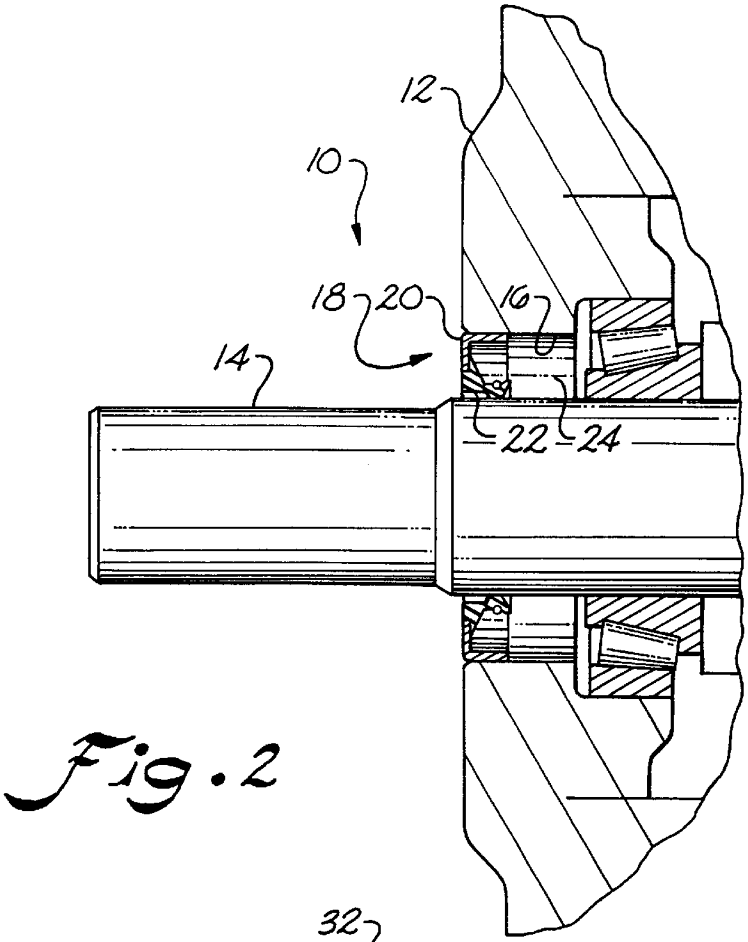
FIG. 2 is a partial cross-sectional view of a shaft assembly for use with a tool or cover according to a preferred embodiment of the present invention.

An annular seal 18 extends between shaft 14 and the inner circumference of bore 16. Referring also to FIG. 2, the lip seal construction of seal 18 should be well understood by those skilled in this art. Seal 18 includes a rigid outer portion 20 secured to the inner circumference of bore 16 by an interference fit and an elastomeric portion 22 extending from rigid portion 20 to shaft 14. Rigid portion 20 may be formed from any suitable material, for example steel or hard polymer materials. Elastomeric portion 22 may be formed from any suitable elastomer material. Elastomeric portion 22 deflects axially inward, with respect to shaft 14, toward an interior area 24 of speed reducer 10 as portion 22 extends from rigid portion 20 to engage shaft 14. Thus, seal 18 is able to retain lubricant in area 24 while effectively preventing entrance of external contaminants.

Figure 3:
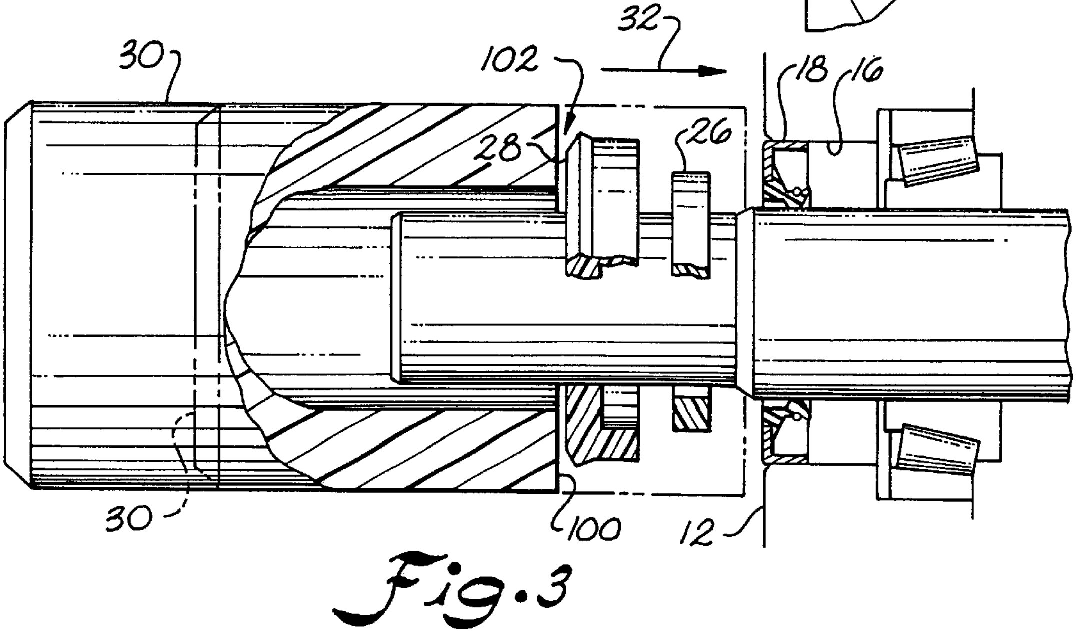
FIG. 3 is a partial cross-sectional view of the shaft assembly as in FIG. 2.
Figure 4:
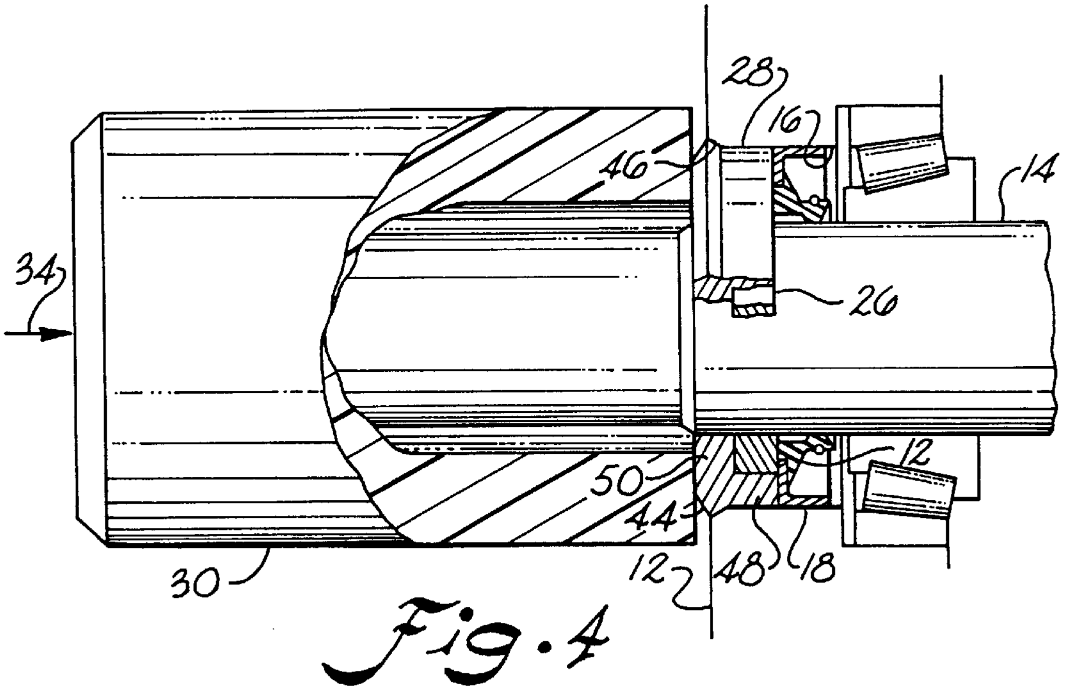
FIG. 4 is a partial cross-sectional view of the shaft assembly as in FIG. 2.

Referring to FIGS. 1 and 3, an auxiliary seal comprised of a second annular seal member 26 and a third annular seal member 28 is placed over shaft 14. A hollow tool 30 as described below is then placed over shaft 14 and hammered axially inward, as indicated by arrow 32, to drive the second and third members into position as shown in FIG. 4. This drives seal 18 axially inward within bore 16 from its position shown in FIG. 2 to its position shown in FIG. 4.

An inner circumferential surface 36 of second member 26 establishes an interference fit with shaft 14, and second member 26 therefore rotates with the shaft. An outer circumferential surface 38, however, sufficiently clears an inner circumferential 40 of third member 28 to allow relative rotation between the second and third members. An outer circumferential surface 42 of third member 28 forms an interference fit with the internal circumference of bore 16. An annular lip portion 44 of third member 28 abuts a radially extending edge 46 of bore 16.

Accordingly, referring specifically to FIG. 4, third member 28 and annular seal 18 are rotationally fixed to housing 12, while second member 26 is rotationally fixed to shaft 14. Third member 28 includes a first annular portion 48 extending between housing 12 and second member 26 and a second annular portion 50 extending from the housing to the shaft, thereby forming a groove that receives second member 26. Thus, the interfaces between second annular portion 50 and shaft 14, between third member 28 and second member 26, and between second member 26 and seal 18 form a labyrinth between the exterior area and the point at which elastomeric portion 22 engages the shaft. The labyrinth protects the flexible lip portion of seal 18 from dust and other debris and from direct contact with pressurized water used to clean the speed reducer.

Referring again to FIG. 1, third member 28 in a second embodiment includes a radially extending flange 52 so that the third member may be secured to housing 12 by bolts 54 that extend through holes 56 and threadedly engage tapped holes (not shown) in housing 12. In this embodiment, therefore, outer circumferential surface 42 of first annular portion 48 need not form an interference fit with the inner circumference of bore 16.

In a preferred embodiment, second member 26 and third member 28 are formed by a hard plastic material such as DELRIN.

It should be understood that the seal assembly formed by seal 18 and the auxiliary seal may be constructed in any suitable manner and that the embodiments illustrated in the Figures are provided for exemplary purpose only. Thus, for example, an elastomeric inner portion of seal 18, when present, need not deflect axially inward. Further, while in each three-part seal assembly shown herein, the first and third annular members are rotationally fixed to the housing, and the second member is rotationally fixed to the shaft, it should be understood that these arrangements may be reversed.

Referring to FIGS. 1 and 2, annular seal 18 initially surrounds rotatable shaft 14 at the edge of bore 16. Referring also to FIGS. 3 and 4, second member 26 and third member 28 are then placed over rotatable shaft 14 and seated against annular seal 18. Tool 30 is placed over the shaft so that the shaft is received by an interior cavity 106 and so that an annular surface 100 defined at the tool's open end 102 abuts third member 28. Upon applying axial force 32 to tool 30, for example by hammer blows, annular surface 100 impacts third member 28, thereby pushing second member 26 and third member 28 to their positions as shown in FIG. 4.

Figure 12:
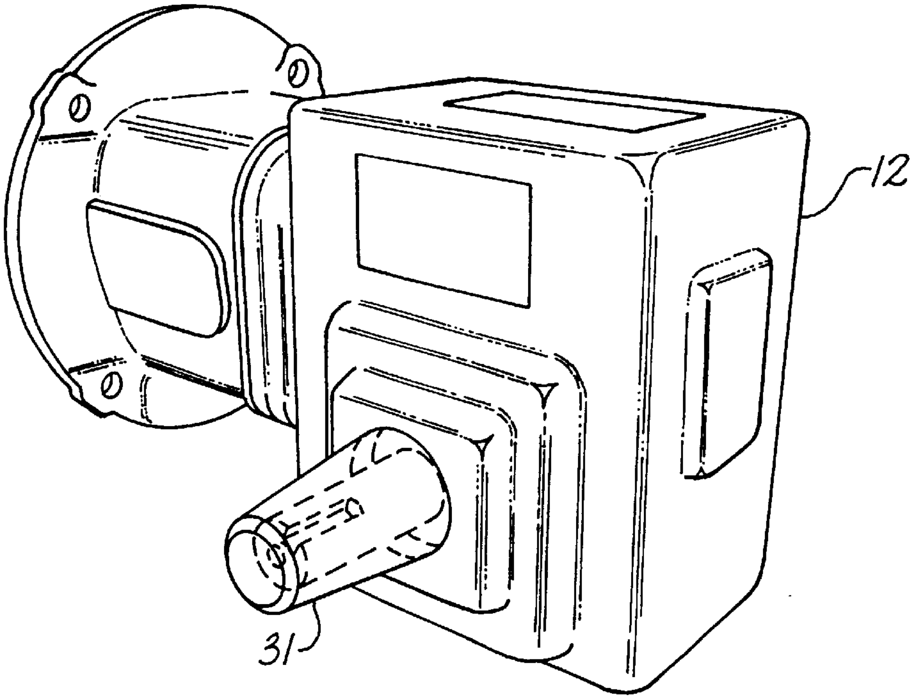
FIG. 12 is a perspective view of a shaft assembly according to a preferred embodiment of the invention.
Figure 13:
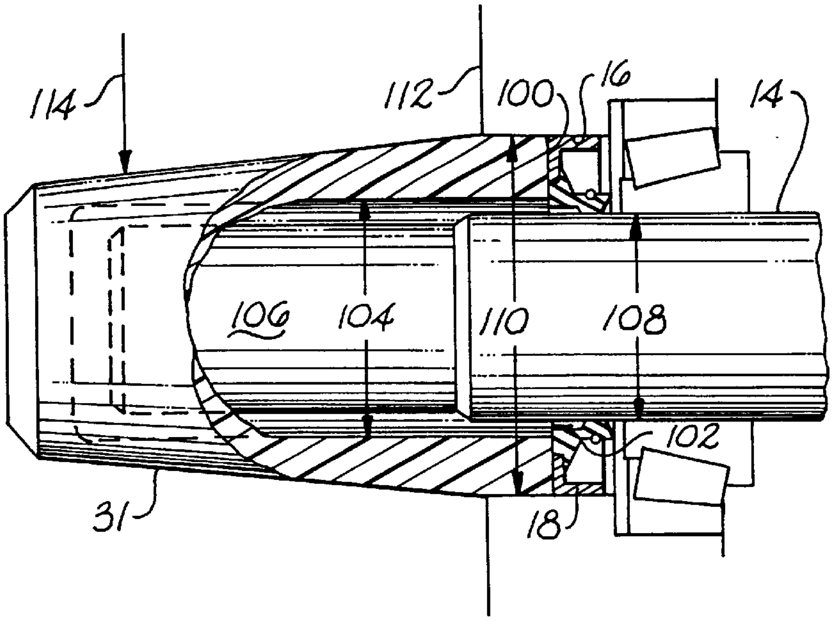
FIG. 13 is a partial cross-sectional view of the shaft assembly as in FIG. 12.

In another embodiment of the invention as illustrated in FIGS. 12 and 13, a tool 31 is used with a speed reducer having a double extended shaft to cover a shaft 14 not in use and the outlet of bore 16. As discussed above regarding tool 30, tool 31 may be used to drive seal 18 back into the bore, as shown in FIG. 13, when the seal is initially disposed at the bore's edge. The frusto-conically shaped tool 31 defines an interior diameter 104 larger than diameter 108 of shaft 14 so that the shaft turns freely within cavity 106. Outer diameter 110 of end 102 measures slightly greater than the inner diameter of bore 16 so that the tool is held in place against housing 112 through a removable frictional seal between the inner circumferential surface of bore 16 and the outer circumferential surface of tool 31. Thus, the tool may both receive the shaft and be contained by the bore.

The removable frictional seal seal holds the tool in place despite the effects of gravity and normal vibrations but may be loosened to remove the tool without damage thereto by applying a force 114 generally perpendicular to the axial direction of the rotatable shaft 14. The tool's frusto-conical shape facilitates rotation of end 102 within bore 16 upon application of force 114 so that the upper edge of end 102 is released from the bore.

In one preferred embodiment, tool 31 is constructed from a suitable polymer such as DELRIN or polypropylene. It should be appreciated, however, that the tool's configuration, including the shapes of its exterior surface and its interior cavity, may vary. Additionally, the tool may be used to drive or cover seals of various configurations. Thus, it should be understood that the embodiment illustrated in FIGS. 12 and 13 is provided for exemplary purposes only.

In certain embodiments, a lip seal such as shown in FIGS. 2–4 is fixed to the housing bore and extends radially inward to engage the shaft. A second annular member is rotationally fixed to the shaft axially outward of the elastomeric portion and extends radially outward from the shaft to cover the elastomeric portion. That is, in comparison to the embodiment shown in FIG. 4, third member 28 is omitted, and second member 26 may be extended radially outward.

Figure 5:
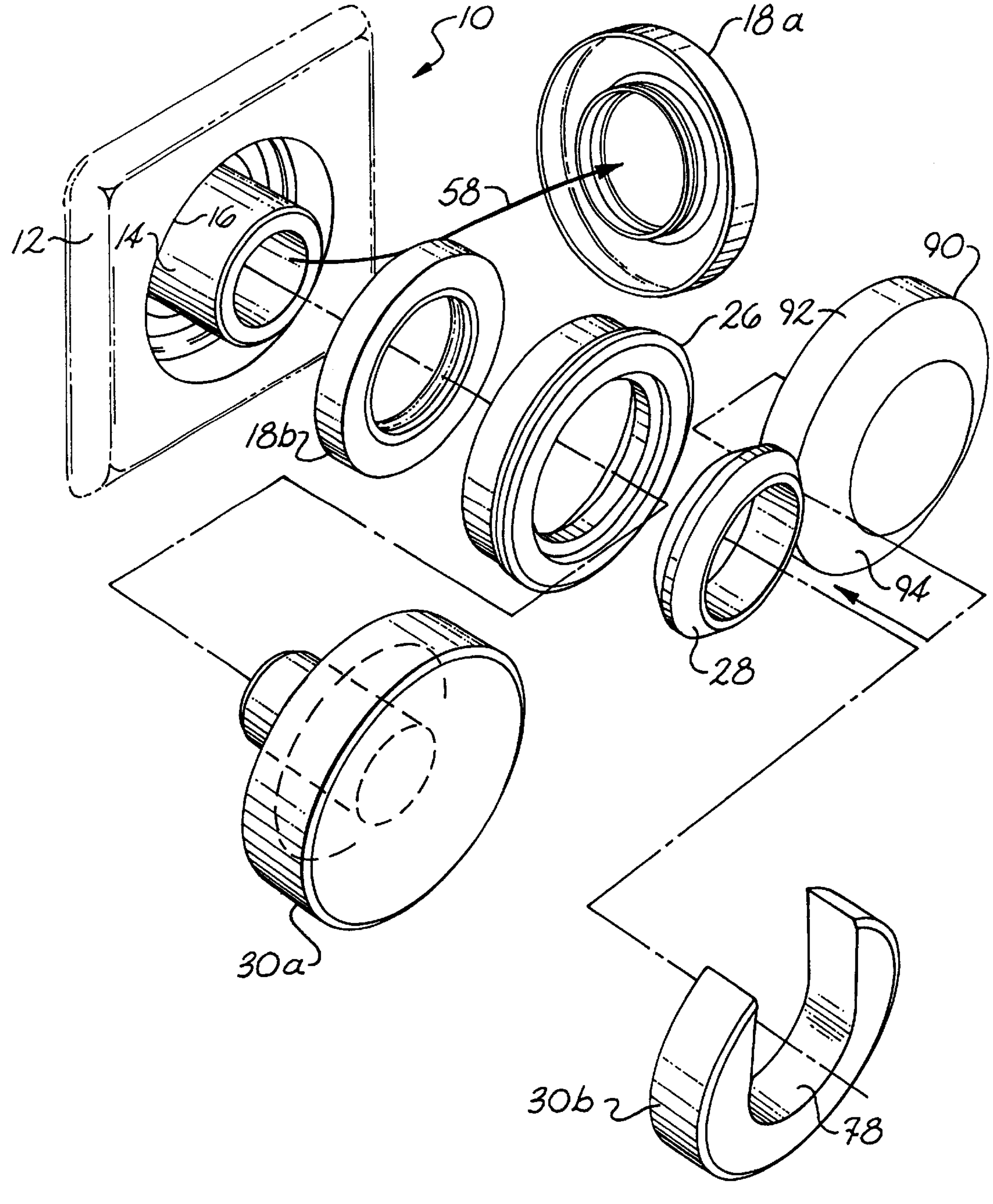
FIG. 5 is an exploded view of a shaft assembly for use with a tool or cover according to a preferred embodiment of the present invention.
Figure 6:
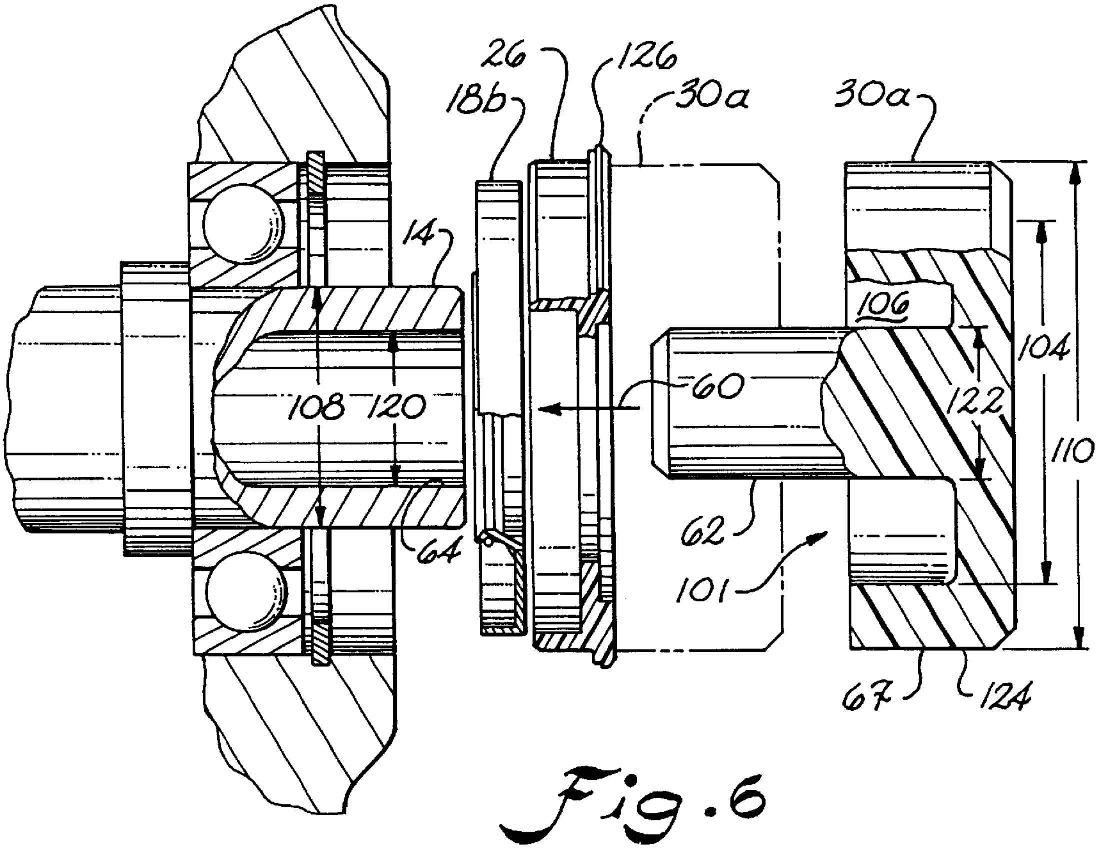
FIG. 6 is a partial cross-sectional view of the shaft assembly as in FIG. 5.
Figure 7:
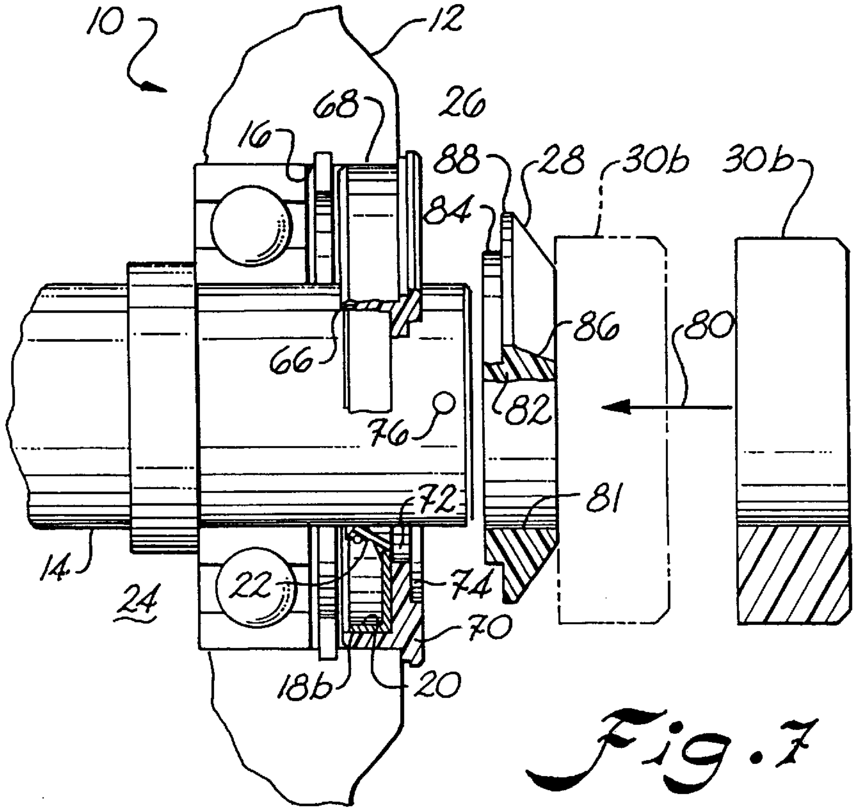
FIG. 7 is a partial cross-sectional view of the shaft assembly as in FIG. 5.

In another preferred embodiment of the present invention shown in FIG. 5, a speed reducer 10 includes a shaft 14 extending from a bore 16 of housing 12. As the present invention may be installed as a retrofit, an originally installed seal 18*a* is removed as indicated by arrow 58 and is replaced by a seal assembly comprising a first seal member 18*b*, a second seal member 26 and a third seal member 28. Referring also to FIGS. 6 and 7, lip seal 18*b* and second member 26 are placed on shaft 14 and tapped into position by a first tool 30*a* as indicated by arrow 60.

Lip seal 18*b* includes a rigid outer portion 20 and an elastomeric inner portion 22 that deflects axially inward as it extends from the rigid outer portion to engage the shaft. Lubricant may be maintained in an interior area 24 defined axially inward of seal 18*b*.

Second member 26 includes a first annular portion 66 extending between housing 12 and outer portion 20 of lip seal 18*b*. Annular portion 66 defines an outer circumferential surface 68 received by bore 16 in an interference fit to rotationally fix second member 26 to the housing. The outer portion of the lip seal is, in turn, received by annular portion 66 in an interference fit. Thus, the lip seal may be pressed into annular portion 66 prior to mounting onto shaft 14 so that the lip seal and second member may be installed together. A second annular portion 70 of second member 26 defines a first inner circumferential surface 72 and a second inner circumferential surface 74 axially and radially outward of surface 72.

Tool 30*a* has a body 124 with a first end 101 in which is formed an interior cavity 106. An approximately centered protrusion or central stem portion 62 extends axially from end 101. Central stem portion diameter 122 is smaller than hollow rotatable shaft interior diameter 120 so that stem portion 62 may be slidably received by hollow rotatable shaft 14. Once the stem portion is inserted into the shaft so that a cup-shaped outer portion 67 abuts second member 26, as shown in phantom in FIG. 6, hammer blows received at end 101 push lip seal 18*b* and second member 26 into position about shaft 14.

Cup-shaped outer portion 67 defines cavity 106, which in turn defines an interior cavity diameter 104 that is greater than hollow rotating shaft exterior diameter 108. Thus, if necessary, hollow shaft 14 may extend into interior cavity 106. Cup-shaped portion 67 mates with flange 126 on second member 26 so that flange 126 is not deformed as second member 26 is pushed into position around shaft 14.

In the particular speed reducer 10 shown in FIGS. 5 and 7, a machine shaft (not shown) is inserted into the bore of shaft 14 and is secured by set screws 76. If third annular member 28 were to be placed on shaft 14 at the same time as seal 18*b* and second member 26, it would cover the set screws and prevent their tightening onto the machine shaft. Accordingly, following the placement of seal 18*b* and second member 26 on shaft 14, third member 28 is placed over the machine shaft, which is then inserted into the bore of shaft 14 and secured to shaft 14 by the set screws. An operator may then slide third member 28 up to second member 26 and drive it into position by a tool 30*b*. Tool 30*b* includes a cut out portion 78 (FIG. 5) to receive the machine shaft and/or shaft 14 so that the tool may be placed against third member 28 as indicated by arrow 80.

Figure 8:
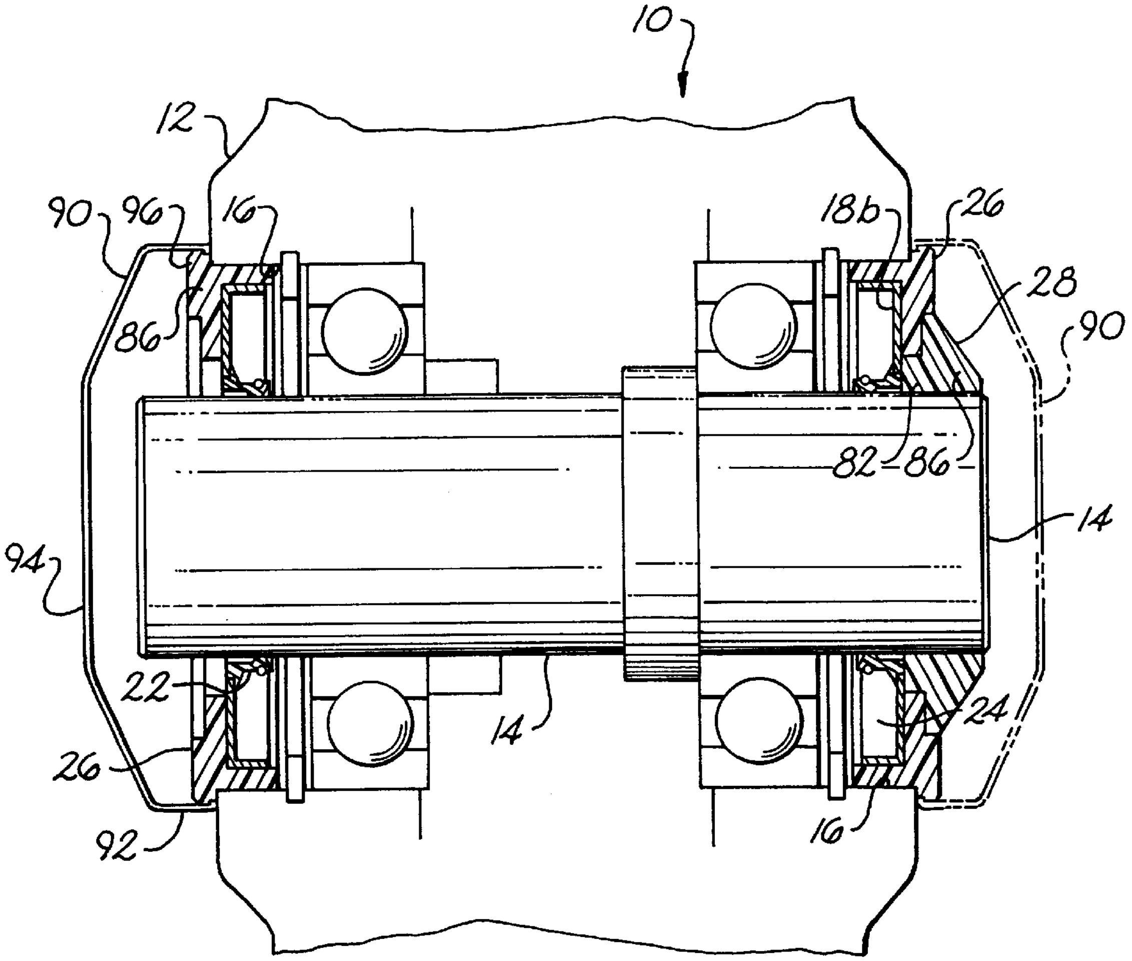
FIG. 8 is a partial cross-sectional view of a shaft assembly for use with a tool or cover according to a preferred embodiment of the present invention.

Third member 28 rotates with shaft 14, while second member 26 and lip seal 18*b* are fixed to the housing. Third member 28 defines an inner circumference 81 that forms an interference fit with shaft 14 as member 28 is tapped onto the shaft by hammer blows to tool 30*b*. It also includes a first annular portion 82 defining an outer circumferential surface 84 and a second annular portion 86 defining an outer circumferential surface 88. Referring also to FIG. 8, as shown at the right hand side of gear reducer 10, first annular portion 82 is received within inner circumferential surface 72 of second member 26, and second annular portion 86 is received within surface 74. Thus, the second and third members form interengaging grooves, and a labyrinth is formed between second member 26 and third member 28 and between third member 28 and seal 18*b* from the exterior to the point at which seal 18*b* engages shaft 14.

Referring specifically to FIGS. 5 and 8, speed reducer 10 includes a central shaft 14 extending entirely though housing 12 so that the reducer may be positioned at a desired axial point on a machine shaft. That is, the speed reducer may be slidably moved on the machine shaft to properly position the speed reducer with respect to an input drive shaft (not shown). If, however, the machine shaft does not extend entirely through shaft 14, an end cap 90 may be used to cover bore 16 and the open end of shaft 14. Cap 90 has a cup-shaped body defining an annular flange portion 92 extending about an open end of the body and surrounding a central portion 94. Flange 92 includes an inwardly curving edge that is received within a gap defined between housing 12 and an annular lip 96 of annular portion 86 of second member 26.

Thus, cap 90 is axially fixed to the housing through the engagement of opposing lips formed by the cap and the seal assembly. The opposing lips on the cap and seal need not be continuous. For example, the cap lip may comprise fingers received in spaced apart recesses in the housing or seal. The cap is preferably made from a flexible polymer material so that it may be removed.

As shown at the left hand side of FIG. 8, the third annular member 28 is not installed since the machine shaft is not attached at this end. Thus, cap 90 protects annular lip portion 22. Of course, provided there is no interfering machine shaft, cap 90 may be used to cover bore 16 even where third member 28 is present, as indicated in phantom at the right hand side of FIG. 8.

Figure 11:
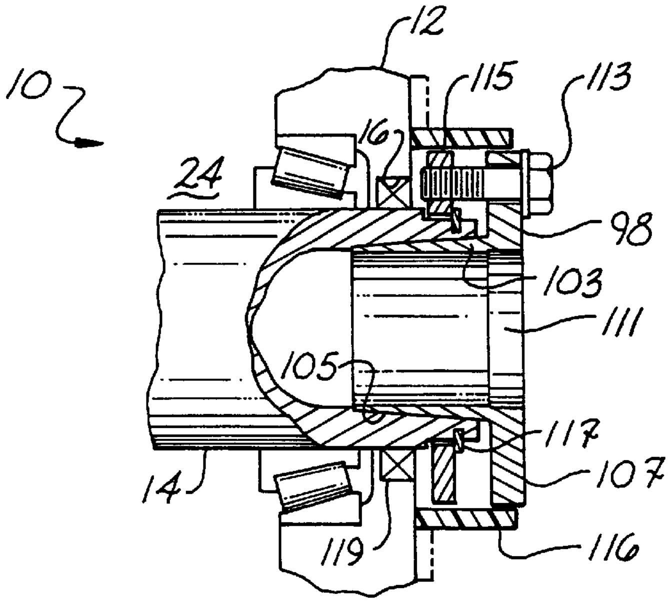
FIG. 11 is a partial cross-sectional view of the shaft assembly as in FIG. 9.
Figure 9:
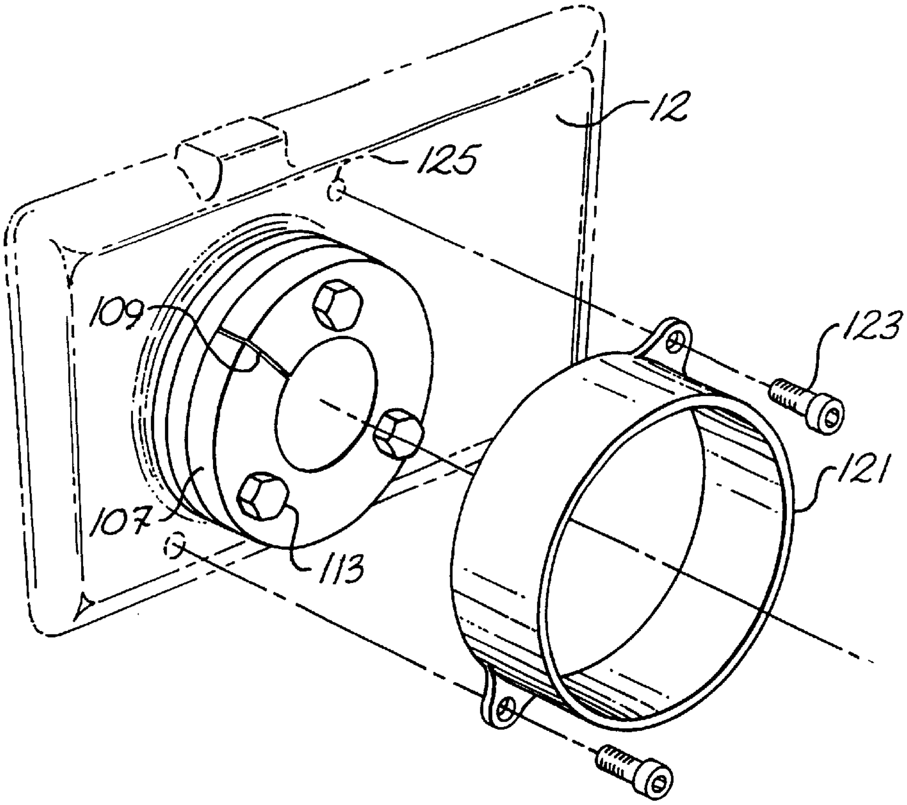
FIG. 9 is a partial exploded view of a shaft assembly for use with a tool or cover according to a preferred embodiment of the present invention.
Figure 10:
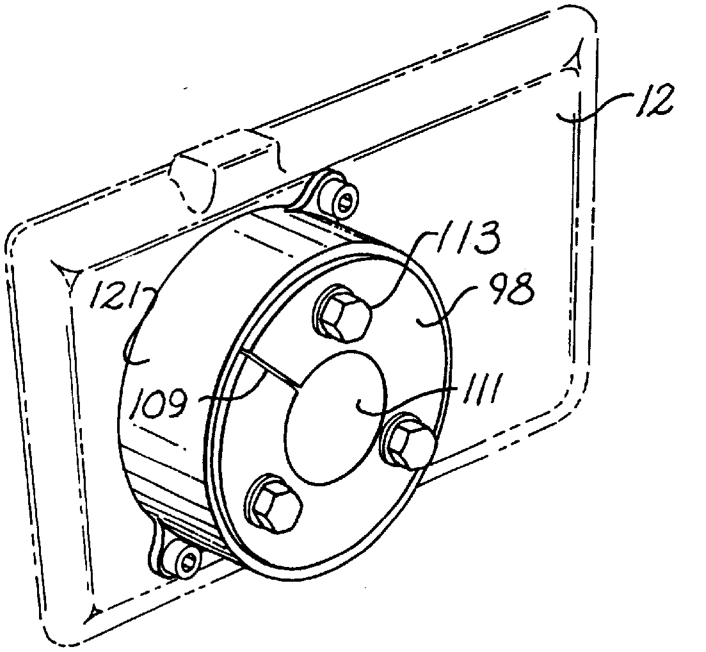
FIG. 10 is a partial perspective view of the shaft assembly as in FIG. 9.

Referring now to FIGS. 9, 10 and 11, a speed reducer 10 includes an output shaft 14 disposed in a housing 12. Depending on the reducer's design, one or two ends may be connected to a machine shaft. Speed reducers, such as illustrated in these and other figures herein, should be well understood in this art and are therefore not discussed in detail. It should be understood, however, that any suitable means for attaching the machine shaft to the output shaft may be used. In the example shown in FIGS. 9–11, the interior bore of shaft 14 is tapered, with the diameter expanding outward towards the shaft's end. An attachment collar 98 includes a central section 103 received in the shaft bore and having an outer circumferential surface 105 defining a taper that corresponds to the shaft taper. Collar 98 defines a radial cut 109 so that compression of the collar reduces the diameter of the collar's central bore 111. Thus, when the center portion of collar 98 is pushed axially into the shaft bore, the diameter of bore 111 is reduced as the outer tapered surface 105 of collar 98 slides down against the inner tapered surface of shaft 14, thus securing a machine shaft (not shown) to shaft 14. Collar 98 is rotationally fixed to shaft 14 by friction or other means.

Collar 98 includes an annular flange 107 having holes through which three bolts 113 extend. Bolts 113 threadedly engage holes in a ring 115 axially retained on shaft 14 by a clip 117. As bolts 113 are tightened into ring 115, collar 98 is pulled axially inward into shaft 14, thus tightening the collar onto the machine shaft.

An annular seal 119, for example made of an elastomeric material, is rotationally fixed to housing 12 in bore 16 and retains lubricant within interior area 24 of gear reducer 10. To provide auxiliary protection, an annular ring 121 is received about ring 115 and flange 107. Ring 121 is attached to housing 12 by screws 123 received in threaded holes 125 tapped into housing 12. Ring 121 may be made, for example, from a metal or a hard polymer material such as DELRIN. Although ring 121 is attached to the housing block axially and radially outward of bore 16, it may also be considered an extension of the bore from the block so that flange 107 and ring 115 form annular members creating a labyrinth between the exterior area and seal 119.

While one or more preferred embodiments of the invention have been described above, it should be understood that any and all equivalent realizations of the present invention are included within the scope and spirit thereof. For example, the present invention may be embodied in a variety of shaft assemblies in which a rotatable shaft is disposed in a housing and within a bore in the housing extending between the exterior area and an interior area. Thus, the present invention is not limited to motors and speed reducers, and the embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the literal or equivalent scope of the appended claims.

What is claimed is:

1. A tool for driving an annular seal into a cavity defined by a shaft assembly housing that surrounds a rotatable shaft, said tool comprising an elongated body having an interior cavity that opens at a first end of said body for receiving said shaft, said body defining an annular surface at said first end to abut said seal, and said annular surface having an inner diameter greater than an outer diameter of said shaft and having an outer-diameter forming a removable frictional seal with an inner diameter of said cavity, wherein an exterior surface of said body is frusto-conical in shape from said first end of said body to a second opposing end of said body.

2. A shaft assembly, said assembly comprising:

a housing having a bore formed therein;

a shaft disposed rotatably in said housing and within said bore;

a seal extending between said shaft and a circumferential surface of said bore; and a tool for driving said seal into said cavity, said tool including an elongated body having an interior cavity that opens at a first end of said body for receiving said shaft, wherein said body defines an annular surface at said first end to abut said seal, and wherein said annular surface has an inner diameter greater than an outer diameter of said shaft and an outer diameter forming a removable frictional seal with an inner diameter of said interior cavity.

3. An assembly as in claim 2, wherein an exterior surface of said body is frusto-conical in shape.

4. An assembly as in claim 3, wherein said frusto-conical shape begins at said first end abutting said seal and tapers to a second end opposite said first end.

* * * * *